United States Patent [19]

Artykov et al.

[11] Patent Number: 4,948,835

[45] Date of Patent: Aug. 14, 1990

[54] PROCESS FOR PRODUCING WATER-SOLUBLE POLYELECTROLYTE

[75] Inventors: Farykhdzhon A. Artykov; Sadriddin Zainutdinov; Karim S. Akhmedov, all of Tashkent, U.S.S.R.

[73] Assignee: Institut Khimii Akademii Nauk, Uzbekskoi, U.S.S.R.

[21] Appl. No.: 201,474

[22] Filed: Jun. 1, 1988

[51] Int. Cl.$^5$ .......................... C08J 3/24; C08L 89/00
[52] U.S. Cl. .................................................. 524/704
[58] Field of Search ........................................ 524/704

[56] References Cited

U.S. PATENT DOCUMENTS 3,784,491 1/1974 Pozorski ............................. 524/704
4,542,184 9/1985 Eck et al. ............................ 524/704

FOREIGN PATENT DOCUMENTS 475370 12/1973 U.S.S.R. .

OTHER PUBLICATIONS

Gardner et al., "Chemical Synonyms and Trade Names", Technical Press Ltd. (1971), London, p. 354.
Kirk-Othmer, Concise Encyclopedia of Chemical Technology, John Wiley and Sons, Inc., 1985, p. 565.
Uzbexky Khimichesky Zhurnal 1962.

*Primary Examiner*—Nathan M. Nutter
*Attorney, Agent, or Firm*—Ladas & Parry

[57] ABSTRACT

A process for producing a water-soluble polyelectrolyte which comprises reacting acrylic acid and/or methacrylic acid with ammonium carbonate at a temperature of 15°–20° C. and at a molar ratio of the acrylic acids to ammonium carbonate of 1–4:1 respectively; the resulting reaction mass is added with hydrogen peroxide in an amount of 0.1–1.0% by mass of the acrylic acids and with a 5–14% aqueous solution of a joiner's glue based on animal-origin proteins in an amount of 0.7–2.0% by mass of acrylic acids as calculated for dry solids, the reaction mass is polymerized first at a temperature of 15°–23° C. for 30–60 minutes and then—at a spontaneous elevation of temperature to 110°–130° C.

1 Claim, No Drawings

PROCESS FOR PRODUCING WATER-SOLUBLE POLYELECTROLYTE

FIELD OF THE INVENTION

The present invention relates to polymer chemistry and, more specifically, to processes for producing water-soluble polyelectrolytes. Said water-soluble polyelectrolytes can be used as flocculants in clarification and thickening of diverse dispersed systems, for example in hydrometallurgy for concentration of ore pulps, for clarification and cleaning of industrial effluents or natural waters, for intensification of filtration of china-clay suspensions. Furthermore, water-soluble polyelectrolytes can be useful as soil conditioners (in the formation of an artificial soil structure).

BACKGROUND OF THE INVENTION

Known in the art is a process for producing a water-soluble polyelectrolyte by reacting acrylic acid with gaseous ammonia with a subsequent polymerization of the resulting reaction mass in the presence of an initiator of polymerization - hydrogen peroxide (cf. Uzbeksky Khimichesky Zhurnal/Uzbek Chemical Journal/, No. 2, 1962, Uzbek Academy of Sciences Publishing House, Tashkent, K. S. Akhmedov, K. V. Pogorelsky, "Production of novel polymeric preparations for artificial structurization of soils and other disperse systems", pp. 43-45).

The polyelectrolyte produced by this prior art process is characterized by an unsatisfactory solubility in water, as well as low flocculating and structuring capacity.

Also known in the art is a process for producing a water-soluble polyelectrolyte comprising reacting acrylic acid with ammonium carbonate at a temperature of 15°-20° C. and the molar ratio of acrylic acid to ammonium carbonate of 2:1 respectively, followed by adding hydrogen peroxide to the reaction mass in an amount ranging from 0.5 to 0.9% by weight of acrylic acid and polymerization of the reaction mass first at a temperature of 78°-80° C. for 20 minutes and then—at a spontaneous elevation of temperature to 110°-130° C. (SU, A, No. 475370).

This prior art process has a disadvantage residing in that a preliminary heating of the reaction mass to 78°-80° C. is necessary to carry out the polymerization process which is associated with increased consumption of energy.

Another disadvantage of the prior art process referred to resides in that the resulting polyelectrolyte has a low molecular weight (intrinsic viscosity of the polyelectrolyte $[\eta]$ in a 3% aqueous solution of sodium chloride at 25° C. is equal to 1.8-2.04) which impairs flocculant capacity of the polyelectrolyte, as well as its structuring capacity in the formation of an artificial soil structure. Thus, in thickening of ore pulps at weight ratio of the solid phase (S) to the liquid phase - water (L) equal to 1:4-5 respectively and at the consumption rate of the above-mentioned polyelectrolyte (flocculant) of 50 g per ton of the ore pulp the coefficient of flocculating capacity is 0.87. The rate of filtration of a 10% china-clay suspension upon introduction of 200 g of the above-mentioned polyelectrolyte per ton of the suspension is 16.9 ml/min. In the formation of an artificial soil structure, for example sierozem (gray desert soil) (plowing depth 0-25 cm) the structuring capacity of this polyelectrolyte (i.e. its ability of forming water-resistant soil aggregates of a diameter above 0.25 mm) at the concentration of the polyelectrolyte in sierozem of 0.003% by weight is 19.3%.

SUMMARY OF THE INVENTION

It is an object of the present invention to provide such a process for producing a water-soluble polyelectrolyte which would make it possible to considerably reduce power consumption for polymerization.

It is another object of the present invention to provide such a process which would make it possible to produce a water-soluble polyelectrolyte with a high molecular weight and featuring improved flocculating and structuring capacity.

These and other objects of the present invention are accomplished by the provision of a process for producing a water-soluble polyelectrolyte which comprises reacting acrylic acid and/or methacrylic acid with ammonium carbonate at a temperature of 15°-20° C. and at a molar ratio of the acrylic acid and/or methacrylic acid to ammonium carbonate of 1-4:1 respectively with subsequently adding hydrogen peroxide to the reaction mass in an amount ranging from 0.1 to 1.0% by mass of the acrylic acids and polymerizing the reaction mass accompanied by a spontaneous elevation of temperature to 110°-130° C.; in accordance with the present invention, in addition to hydrogen peroxide the reaction mass is also added with a 5-14% aqueous solution of a joiner's glue based on animal-origin proteins in an amount ranging from 0.7 to 2.0% by mass of the acrylic acids as calculated for dry solids, the polymerization of the reaction mass is effected first at a temperature of 15° to 23° C. for 30 to 60 minutes and then—at a spontaneous elevation of temperature up to 110°-130° C.

As defined in Chemical Synonyms and Trade Names, by William Gardner (7th Ed.), 1971, page 350, Joiner's Glue is either skin or bone glue. As described in Concise Encyclopedia of Chemical Technology, Kirk Othmer, 3rd Edition, 1985, animal glue refers to that material which is produced by the hydrolysis of the proteins collagen, which is found in specific animal tissues, skin, hides, bones, and tendons.

Owing to carrying out the process of polymerization in the presence of a joiner's glue which serves as an initiator of polymerization in addition to hydrogen peroxide, the whole process is conducted for 30-60 minutes at a temperature of 15°-23° C. which enables a substantial lowering of power consumption for the polymerization process.

Furthermore, the process according to the present invention makes it possible to obtain a water-soluble polyelectrolyte with a high molecular weight (the intrinsic viscosity of the polyelectrolyte $[\eta]$ in a 3% aqueous solution of sodium chloride at the temperature of 25° C. is equal to 4.0-4.32). This, in turn, improves flocculating capacity of the polyelectrolyte and its structuring capacity in the formation of an artificial soil structure. For example, in thickening of ore pulps at a weight ratio of the solid phase (S) to the liquid phase - water (L) equal to 1:4-5 respectively and at the rate of consumption of the above-mentioned polyelectrolyte (flocculant) of 50 g per ton of the ore pulp the coefficient of flocculating capacity is 1.03. The rate of filtration of a 10% china-clay suspension upon introduction of 200 g of the above-mentioned polyelectrolyte per ton of the suspension is equal to 19.2 ml/min. In the formation of an artificial soil structure, for example sierozem (plowing depth 0–25 cm) the structuring capacity of the above-mentioned polyelectrolyte (i.e. its ability of forming water-resistant soil aggregates of a diameter of above 0.25 mm) at the concentration of the polyelectrolyte in sierozem of 0.003% by mass is 23.2%.

As it has been mentioned hereinbefore, in the process according to the present invention the reaction of acrylic acid and/or methacrylic acid with ammonium carbonate is conducted at a temperature within the range of from 15° to 20° C. It is inadvisable to carry out the process at a temperature below 15° C., since this process at lower temperatures is decelerated and additional power consumption is required for carrying out a subsequent process of polymerization to elevate temperature to the required level (15°–23° C.). It is also inadvisable to conduct the process of interaction of acrylic acid and/or methacrylic acid with ammonium carbonate at the temperature of above 20° C., since at higher temperatures an intensive decomposition of ammonium carbonate occurs.

A molar ratio of the acrylic acid to ammonium carbonate in the process according to the present invention is equal to 1–4:1 respectively. It is undesirable to use the acrylic acids and ammonium carbonate in the molar ratio therebetween of less than 1:1 because there is no complete substitution of carboxy groups of the acrylic acids with ammonium groups of ammonium carbonate. It is also inexpedient to use the acrylic acids and ammonium carbonate in their molar ratio above 4:1 due to homopolymerization of the acrylic acids.

In the process according to the present invention polymerization is conducted in the presence of hydrogen peroxide in an amount ranging from 0.1 to 1.0% by mass of the acrylic acid and/or methacrylic acid. It is inadvisable to use hydrogen peroxide in an amount of less than 0.1% by mass of the acrylic acid and/or methacrylic acid, since polymerization does not proceed at all. It is neither advisable to use hydrogen peroxide in an amount over 1.0% by weight of the acrylic acid and/or methacrylic acid, since the resulting water-soluble polyelectrolyte has an insufficient molecular mass.

As it has been already mentioned hereinbefore, the process of polymerization is also conducted in the presence of a joiner's glue based on animal-origin proteins in an amount of from 0.7 to 2.0% by weight of the acrylic acids. It is undesirable to use the joiner's glue in an amount of less than 0.7% by weight of the acrylic acids, since polymerization is decelerated and for its acceleration additional power is required. It is undesirable to use the joiner's glue in an amount exceeding 2% by weight of the acrylic acids, since no additional intensification of the polymerization process is attained.

The joiner's glue is introduced into the reaction mass in the form of a 5–14% aqueous solution. It is inexpedient to use the glue solution in a concentration less than 5%, since in this case an excessive amount of water is introduced into the reaction mass, thus hindering the polymerization process. It is also inadvisable to use the glue solution in a concentration over 14%, since the glue solution at higher concentration becomes very viscous which makes difficult its intermixing with the reaction mass.

According to the present invention, the polymerization is conducted first, as it has been already mentioned hereinbefore, at a temperature within the range of from 15° to 23° C. for a period of from 30 to 60 minutes. It is inadvisable to conduct the process at a temperature below 15° C., since in this case polymerization proceeds very slowly. It is also inadvisable to conduct polymerization at a temperature above 23° C., since a water-soluble polyelectrolyte obtained in this case has an insufficient molecular weight. It is also undesirable to carry out polymerization within the above-specified temperature range for a period less than 30 minutes, since during this time the initiating capacity of hydrogen peroxide and joiner's glue is not fully realized and the process of polymerization proceeds but slowly. It is neither desirable to conduct polymerization within the above-specified temperature range for a period over 60 minutes, since in this case the resulting water-soluble poleyelectrolyte has a low molecular weight.

DETAILED DESCRIPTION OF THE INVENTION

The process for producing a water-soluble polyelectrolyte according to the present invention is carried out in the following manner.

Into a vessel provided with a thermometer and a stirrer acrylic acid and/or methacrylic acid is charged (in the case of using a mixture of the acids their ratio can be varied) and ammonium carbonate in predetermined proportions (a molar ratio of the acrylic acids to ammonium carbonate is equal to 1–4:1 respectively) at a temperature within the range of from 15° to 20° C. and stirring is effected at this temperature. This results in interaction of acrylic acid and/or methacrylic acid with ammonium carbonate so that carboxy groups of the acrylic acids are substituted wirh ammonium groups of ammonium carbonate. Then the resulting reaction mass is added with hydrogen peroxide in an amount of from 0.1 to 1.0% by mass of the acrylic acids and a 5–14% solution of a joiner's glue based on animal-origin proteins in an amount of from 0.7 to 2.0% by mass of the acrylic acid as calculated for dry solids.

Then the reaction mass is subjected to polymerization at a temperature within the range of from 15° to 23 C. for 30 to 60 minutes and then—at a spontaneous elevation of temperature up to 110°–130° C. for 10 to 20 minutes at an intensive liberation of vapours of water and carbon dioxide.

On completion of the polymerization reaction which is established by discontinuation of evolution of vapours of water a water-soluble electrolyte is obtained in the form of a porous mass which after solidification is readily disintegrated into a powder. The resulting polyelectrolyte is well soluble in water forming stable viscous solutions. The polyelectrolyte is transportable and stable in a long-time storage.

For a better understanding of the present invention some specific examples illustrating its particular embodiments are given hereinbelow. The data on flocculating and structuring capacity of the resulting polyelectrolytes are presented after the Examples.

EXAMPLE 1

Into a vessel provided with a thermometer and a stirrer there are charged 72 g (1 mol) of acrylic acid, 86 g (1 mol) of methacrylic acid and 96 g (1 mol) of ammonium carbonate and these acrylic acids are reacted with ammonium carbonate at the temperature of 20° C. under stirring. Then the resulting reaction mass is added with 0.4 g of a 33% hydrogen peroxide (0.4% by mass of the acrylic acids) and a solution of 1.1 g of a joiner's glue based on animal-origin proteins in 10 ml of water (0.7% by mass of the acrylic acids as calculated for dry solids). Polymerization of the reaction mass is conducted first at the temperature of 15° C. for 40 minutes and then—at a spontaneous elevation of temperature to 110°–130° C. for 15 minutes at an intensive evolution of vapours of water and carbon dioxide.

On completion of the reaction of polymerization a water-soluble polyelectrolyte is obtained in the form of a porous mass which after solidification can be readily disintegrated into a powder.

EXAMPLE 2

A water-soluble polyelectrolyte is obtained in a manner similar to that described in the foregoing Example 1. In doing so, acrylic acid is used in the amount of 144 g (2 mol), ammonium carbonate—in the amount of 96 g (1 mol). The reaction of acrylic acid with ammonium carbonate is carried out at the temperature of 17° C.

Hydrogen peroxide (33%) is used in the amount of 0.15 g (0.1% by mass of acrylic acid) and a joiner's glue based on animal-origin proteins is used in the amount of 1.2 g dissolved in 20 ml of water (0.83% by mass of acrylic acid as calculated for dry solids).

Polymerization is first conducted at the temperature of 15° C. for 30 minutes and then—at a spontaneous elevation of temperature to 110°–130° C. for 10 minutes.

EXAMPLE 3

A water-soluble polyelectrolyte is produced in a manner similar to that described in Example 1 hereinbefore. Methacrylic acid is used in the amount of 86 g (1 mol), ammonium carbonate—in the amount of 96 g (1 mol). The reaction between methacrylic acid and ammonium carbonate is conducted at the temperature of 20° C.

Hydrogen peroxide (33%) is used in the amount of 0.9 g (1.0% by mass of methacrylic acid) and a joiner's glue based on animal-origin proteins is used in the amount of 1.7 g dissolved in 30 ml of water (2.0% by mass of methacrylic acid as calculated for dry solids).

Polymerization is carried out first at the temperature of 23° C. for 60 minutes and then—at a spontaneous elevation of temperature to 110°–130° C. for 20 minutes.

EXAMPLE 4

A water-soluble polyelectrolyte is produced as described in Example 1. Acrylic acid is used in the amount of 288 g (4 mol) and ammonium carbonate in the amount of 96 g (1 mol). The reaction between acrylic acid and ammonium carbonate is conducted at the temperature of 15° C.

Hydrogen peroxide (33%) is used in the amount of 1.7 g (0.6% by mass of acrylic acid) and a joiner's glue based on animal-origin proteins is employed in the amount of 2.88 g dissolved in 40 ml of water (1.0% by mass of acrylic acid as calculated for dry solids).

Polymerization is conducted first at the temperature of 18° C. for 30 minutes and then—at a spontaneous elevation of temperature to 110°–130° C. for 10 minutes.

The water-soluble polyelectrolytes produced in Example 1 to 4 have similar properties (flocculating and structuring capacity when used for the formation of an artificial soil structure). These properties are further illustrated hereinbelow by water-soluble polyelectrolyte produced as in Example 1 hereinbefore.

The flocculating capacity of the water-soluble polyelectrolyte produced in Example 1 is determined in thickening of ore pulps using this polyelectrolyte (flocculant) at different mass ratios of the solid phase (S) and liquid phase (L) of the above-mentioned polyelectrolyte: 20 and 50 g per ton of the ore pulp.

Efficiency of ths flocculant is expressed in terms of a coefficient of flocculating capacity (K).

The data on the flocculating capacity of this water-soluble polyelectrolyte are shown in Table 1 hereinbelow. For the purpose of comparison presented in the same Table 1 are the data on the flocculating capacity of a water-soluble polyelectrolyte produced according to SU, A, No. 475370; the flocculating capacity is determined under the above-specified conditions.

TABLE 1

| Water-soluble polyelectrolyte (flocculant) | Rate of consumption of the water-soluble polyelectrolyte | | | |
|---|---|---|---|---|
| | 20 g/t | | 50 g/t | |
| | S:L | K | S:L | K |
| Water-soluble polyelectrolyte of Example 1 | 1:0.86 | 0.98 | 1:0.84 | 1.03 |
| Water-soluble polyelectrolyte of SU,A,475370 | 1:0.86 | 0.84 | 1:0.84 | 0.87 |

From the data presented in the above Table 1 it follows that the water-soluble polyelectrolyte produced by the process according to the present invention is a more effective flocculant as compared to the water-soluble polyelectrolyte according to SU, A, No. 475370. The coefficient of flocculating capacity of the water-soluble polyelectrolyte produced by the process according to the present invention is by 16–18% higher than that of the water-soluble polyelectrolyte produced by the process disclosed in SU, A, No. 475370.

The structuring capacity of the water-soluble polyelectrolyte produced as in Example 1 and that of the water-soluble polyelectrolyte produced according to SU, A, No. 475370 are determined in the formation of an artificial structure of sierozem (plowing depth 0–25 cm) at different concentrations of polyelectrolytes in sierozem. The structuring capacity of a polyelectrolyte means its ability of forming water-resistant soil aggregates with a diameter of more than 0.25 mm; the structuring capacity is expressed in terms of percentage of said aggregates in the soil.

The data on the structuring capacity of the above-mentioned water-soluble polyelectrolytes are shown in Table 2.

TABLE 2

| Concentration of water-soluble polyelectrolyte in sierozem, per cent by mass | Content of water-resistant soil aggregates with a diameter of over 0.25 mm, % by mass | | |
|---|---|---|---|
| | Control | Water-soluble polyelectrolyte of Example 1 | Water-soluble polyelectrolyte of SU,A, 475370 |
| 1 | 2 | 3 | 4 |
| 0 | 1.1 | — | — |
| 0.003 | — | 23.2 | 19.3 |
| 0.030 | — | 64.0 | 59.9 |
| 0.150 | — | 73.8 | 68.8 |

From the data of the above Table 2 it is seen that the water-soluble polyelectrolyte produced by the process according to the present invention is an efficient soil conditioner having its structuring capacity by 12–18% higher than that of the water-soluble polyelectrolyte produced by the process according to SU, A, No. 475370.

Therefore, the process according to the present invention makes it possible to produce a water-soluble polyelectrolyte which is an effective flocculant useful in thickening of ore pulps, for intensification of filtration of china-clay suspensions, for clarification and purification of industrial effluents and natural waters, as well as an effective soil conditioning agent.

What is claimed is:

1. A process for producing a water-soluble polyelectrolyte comprising reacting acrylic acid and/or methacrylic acid with ammonium carbonate at a temperature ranging from 15° to 20 ° C. and at a molar ratio of the acrylic acid and/or methacrylic acid to ammonium carbonate of 1-4:1 respectively; the resulting reaction mass is added with hydrogen peroxide in an amount of from 0.1 to 1.0% by weight of the acrylic acid and/or methacrylic acid and with a 5-14% aqueous solution of a joiner's glue based on animal-origin proteins in an amount of from 0.7 to 2.0% by weight of the acrylic acid and/or methacrylic acid used in the reaction as calculated on the dry solid content of the joiner's glue; polymerization of the reaction mass is effected first at a temperature of 15°-23° C. for 30 to 60 minutes and then at a spontaneous elevation of temperature as a result of the heat of the reaction to a temperature in the range of 110°-130° C.

* * * * *